United States Patent [19]

Ishiguro et al.

[11] 3,844,931

[45] Oct. 29, 1974

[54] METHOD OF MANUFACTURING SPECIAL SOLVENT

[75] Inventors: Tadashi Ishiguro; Akio Okagami; Shinichi Igeta; Shimpei Gomi; Masaaki Takahaski, all of Tokyo, Japan

[73] Assignees: Japan Gasoline Company, Ltd., Chiyoda-ku, Tokyo; Kureha Kagaku Kogyo Kabushiki Kaisha, Chuo-ku, Tokyo, both of, Japan

[22] Filed: June 23, 1972

[21] Appl. No.: 265,808

[30] Foreign Application Priority Data

June 30, 1971 Japan.............................. 46-48355

[52] U.S. Cl...................... 208/46, 208/14, 252/364, 260/671 G, 260/671 P
[51] Int. Cl............................................ C07c 3/54
[58] Field of Search ............ 208/14, 46; 260/671 G, 260/671 P; 252/364

[56] References Cited
UNITED STATES PATENTS 3,600,298  8/1971  Mayumi et al.................. 260/671 G
3,663,428  5/1972  Takahashi et al............... 260/671 G
3,714,021  1/1973  Takahashi et al............... 208/14

*Primary Examiner*—Herbert Levine
*Attorney, Agent, or Firm*—Woodhams, Blanchard and Flynn

[57] ABSTRACT

The present invention relates to the method of manufacturing a special solvent applicable to organic compounds having functional groups so that they can serve as dyes, perfumes, insecticides, etc., in which hydrocarbons — which mainly comprise fractions having boiling points in the range of 200° to 280°C and the index number therein expressed by the formula $\delta + 0.625\, b_p - 447$ [wherein $\delta$ represents the specific dispersion at 20°C; $b_p$ stands for the boiling point in °C] is more than $-100$ — are made to react with an olefin in the presence of an acid catalyst, thereby obtaining such fractions having said index number in the range of $-100$ to 40 and having a boiling point of 260°C and above.

5 Claims, No Drawings

METHOD OF MANUFACTURING SPECIAL SOLVENT

BACKGROUND OF THE INVENTION a. Field of the Invention

The present invention relates to a method of manufacturing a less-volatile hydrocarbon solvent applicable as solvents for organic compounds having functional groups.

b. Description of the Prior Art

Generally speaking, for the purpose of dissolving such substances as dyes which have a functional group or groups having a high polarity and also aromatic properties, a solvent having a minor reactivity and a high polarity is desirable. The substances which have hitherto been widely used as solvents for this purpose include vegetable oils, animal oils, etc. These oils, however, are defective in many respects such as having inferior dissolubility, smell, color appearance, etc.

Moreover, in the case of the aromatic mineral oils such as those from coal tar, petroleum tar, etc., despite a minor dipole moment thereof, they have a high polarizability which renders them useful as a special solvent; however, these mineral oils are unsuited for use as solvents for perfumes, dyes or insecticides because they are generally colored dark brown. If the heavy fractions causing such coloring are removed by fractionation, e.g., distillation, the melting point of the distillate will rise, and it will be a solid, unusable as a solvent. A part of the fractions of these tars is of course recoverable, but the recoverable amount is limited, and they are also defective from the viewpoint of stability and smell.

With the recent growth and expansion of large scale apparatuses for the petroleum refining and petrochemical industries, the output of byproduct oil from coke plants and catalytic reforming units, the light and heavy cycle stocks from fluid catalytic cracking units and the byproduct oil from the high temperature cracking of naphtha, crude oil, etc. has become enormous. These heavy fractions, per se, have some advantages as solvents, but because of their defects from the viewpoint of smell, toxicity, fluidity and thermal stability, the scope of their use as solvents in the dye, perfume or insecticide industry has been quite limited, and the majority of them have so far been utilized as a fuel or as the feedstock for carbon blacks.

Polychlorinated biphenyl resulting from chlorination of biphenyl has also been partially utilized as a solvent; but such chlorinated aromatic compound is difficult to degrade biochemically, and is also apt to accumulate within animal lipids to affect finally the human body, causing public detriments such as liver trouble, skin disease and so forth, and accordingly, the scope of utilization thereof has been quite limited.

SUMMARY OF THE INVENTION

The object of the present invention is to provide a method of manufacturing a solvent which is excellent in dye-solubility, non-toxicity, odorlessness and low volatility and which is applicable to the dye, perfume or insecticide industry, through an effective treatment of the above-mentioned heavy fractions which have so far been unused as solvents.

More particularly, the present invention provides a method of manufacturing a heat-transfer medium and a special solvent applicable to organic compounds having functional groups, in which hydrocarbons—which mainly comprise fractions having a boiling point in the range of 200° to 280°C and an index number therein expressed by the formula $\delta + 0.625\ b_p - 447$ [wherein $\delta$ represents the specific dispersion at 20°C; $b_p$ stands for the boiling point in °C] is more than $-100$ and preferably a maximum absorption wave-length $\lambda$max according to the ultraviolet absorption spectrum is in the range of 220 to 230 m$\mu$—are made to react with an olefin having a number of carbon atoms in the range of two to nine under the reaction conditions that the temperature is in the range of 40° to 380°C, the pressure is in the range of 0 to 150 Kg/cm$^2$G and the liquid residence time is in the range of 0.1 to 5.0 hours in the presence of an acid catalyst, thereby obtaining such fractions having said index number in the range of $-100$ to 40 and having a boiling point of 260°C or more.

DETAILED DESCRIPTION OF THE INVENTION

To further elucidate the method according to the present invention, the hydrocarbons to be employed as the starting material in the present invention have a boiling point in the range of 200° to 280°C, and an index number, determined by the specific dispersion and the boiling point, of $-100$ or more. The index number according to the present invention is expressed by the formula $\delta + 0.625\ b_p - 447$ [ wherein $\delta$ represents the specific dispersion at 20°C; $b_p$ stands for the boiling point in °C], and said specific dispersion means the numerical value obtained by measuring the refractive indexes of two rays of different wavelength, namely 6563A and 4861A, at 20°C, dividing the difference between these indexes by the specific gravity and then multiplying the quotient by $10^4$.

The inventors have found that this specific dispersion plays a very important role in determining the properties of the solvent to be produced. According to the method of the present invention, the index deduced from the specific dispersion and the boiling point of the solvent was employed as the criterion in determining the properties of the solvent.

In this connection, the properties to determine the quality of the solvent, such as dye-solubility, non-toxicity, odorlessness, fluidity and low volatility, or color developability in the case of a solvent for dyes, etc. are considerably influenced by the index number of the starting material: when the index number of the starting material decreases below $-100$, the solubility and stability decrease remarkably. For instance, the index of the light cycle oil from fluid catlytic cracking of gas oil is $-170$, and the afore-mentioned properties of a solvent made by the process described herein are very inferior. And in the case of starting materials wherein the index is more than $-100$, a material having the maximum absorption wavelength $\lambda$max according to the ultraviolet absorption spectrum in the range of 220 to 230 m$\mu$ becomes a product remarkably improved in respect of its odor by the method of the present invention, while the product obtained from a starting material having the maximum absorption wavelength $\mu$max in excess of 230 m$\mu$ through treatment by the method of the present invention is sometimes unsatisfactory in the improvement of the smell. To give an example, the fractions having the maximum absorption wave-length $\lambda$max of 240 m$\mu$ resulting from the thermal condensation of benzene are converted into a solvent superior in solubility, thermal stability, etc.

through the method of the present invention, but this solvent has some irritating odor.

In the fractions obtained through the method of the present invention, as the boiling point increases, the odorlessness, and the color appearance as well as the stability against oxidation by air are also drastically improved compared with the starting material. Further it has been found that the fractions having an index number in the range of −100 to 40 and a boiling point of more than 260°C become a satisfactory product improved in all respects of dye-solubility, color developability, non-toxicity, odorlessness, low volatility and thermal stability compared with the starting material.

On the other hand, when the index number of the product is less than −100, the dye-solubility and color developability are insufficient, while if the index number is more than 40, the product is defective from the viewpoint of smell and thermal stability. And, according to the method of the present invention, this index number can be controlled in accordance with the intended use of the solvent.

The starting material defined for the present invention includes hydrocarbons selected from the group consisting of (a) the byproduced heavy oil arising from the high temperature cracking of naphtha or crude oil, etc., (b) the byproduced heavy oil from the manufacture of benzene, naphthalene, etc., from the dealkylation reaction, and (c) the fractions obtained from the catalytic-reforming reaction of naphtha, kerosene, and the like. And, (d) the light cycle oil from catalytic cracking can also be a suitable starting material subject to enhancement of its aromaticity through extraction or the like. Further, the foregoing hydrocarbons subjected to the step for enhancing the thermal stability or the hydrorefining step can also be employed as the starting material in the method of the present invention.

In said step for enhancing the thermal stability, it will suffice to apply the process of separation by polymerizing the readily polymerizable unsaturated compounds, the process of effecting a selective hydrogenation at a comparatively low temperature by using a nickel-containing catalyst which has been previously treated with the certain organic sulfur compounds in the particular mannner proposed in the application for patent previously filed by the present inventors (cf. Japanese Patent Application No. 99046/1969; U.S. Patent Application No. 97231/1969; British Patent Application No. 59163/1970; Canada Patent Application No. 100327/1970; West Germany Patent Application P2061137.4-44), the process employing a nickel catalyst or other known processes.

Said hydrorefining step means the process of effecting hydrogenation of the olefin, desulfurization, denitrogenation, etc. in the presence of a catalyst consisting of molybdenum, cobalt, nickel, etc. under pressure.

Furthermore, instead of resorting to the step for enhancing the thermal stability and the hydrorefining step, it will do to employ hydrocarbons treated with acid or with a solid acidic material as the starting material for the present invention.

The starting material for use in the present invention includes not only those materials which are of liquid state at room temperature but also those of a solid state at room temperature.

According to the method of the present invention, the foregoing hydrocarbons employed as the starting material are made to react with an olefin having a number of carbon atoms in the range of 2 to 9 using an acid catalyst at a temperature in the range of 40° to 380°C, a pressure in the range of 0 to 150 Kg/cm$^2$G and a liquid residence time in the range of 0.1 to 5.0 hours to such reaction extent that 0.5 to 2.0 moles of said olefin are reacted per 1.0 mole of the starting material on the average. The olefin having 2 to 9 carbon atoms includes ethylene, propylene, butylene, cyclopentene, styrene, methyl styrene, and the like. The acid catalyst for use in the present method includes a solid acid catalyst, mineral acid, Friedel-Crafts catalyst, and the like. Said solid acid catalyst means a catalyst in which the acid amount measured by the amine titration method employing the indicator of pKa = 0.8 is in the range of 0.01 to 10 meq./gr. and includes, for instance, silica-alumina, crystalline aluminosilicate, nickel oxide-silica, silver oxide-silica-alumina, silica magnesia, alumina-boria, solid phosphoric acid, and the like. Said mineral acid includes hydrogen, fluoride, sulfuric acid; phosphoric acid, etc. And, said Friedel-Crafts catalyst includes anhydrous aluminum chloride, anhydrous tin chloride, anhydrous boron fluoride, and the like. The liquid substance resulting from the reaction with olefin, when compared with the starting material, shows a rise in boiling point and a lowering of the index number. As a result of the reaction with the olefin, the product is generally fluid: for example, even in case of a starting material having a solid state at room temperature, the product comes to have a sufficient fluidity at temperature below 0°C and occasionally is liquid even at −50°C. Besides, even when fractionated by distillation to a narrow boiling range such as 260° to 320°C, it has a sufficient fluidity. This fluidity constitutes a very important factor in determining the properties of the resulting solvent.

According to the present method, the fractions having an index number in the range of −100 to 40 and a boiling point of more than 260°C obtained from the product resulting from the process of making the olefin react with the starting material are useful as a special solvent for organic compounds having functional groups. Especially, such a fraction comprising more than 90 percent of the fractions boiling in the range of 260° to 320°C obtained through the separation by distillation of said product and having an index number in the range of −100 to 40 has proved suitable for use as a solvent for dye to be applied to pressure-sensitive copying paper.

Further, a fraction obtained by admixing two or more of the special solvents according to the present method at an appropriate ratio, which has an index number in the range of −100 to 40 and a boiling point of more than 260°C, is also excellent as a special solvent. Also, it is possible to add other mineral oil, vegetable oil, alkyl benzene, kerosene, etc. to the special solvents obtained by the method of the present invention as occasion demands.

Hereunder will be given an elucidation as to how these characteristics suited for solvent purposes and superior to the starting material are imparted to said fractions and in what feature the product according to the present invention is superior to the known product. To take an example, it is desired that the solvent for a dye to be applied to a pressure-sensitive copying paper be odorless, colorless and innocuous, and, at the same time it is required to have excellent solubility with regard to color-developability, low volatility and high stability. Referring to the odor or smell to begin with, even a hydrocarbon satisfying the foregoing requirements for the starting material gives forth a fairly strong smell when the index number is more than −100, while the solvent obtained by treating said hydrocarbon by the method according to the present invention and having an index number in the range of −100 to 40 shows a considerable improvement in respect of the smell, and is much superior to the conventional chlorinated biphenyl. As to the solubility in respect of the dye, it is generally considered that the more aromatic the solvent is, the higher is the dye solubility thereof. Inasmuch as the method of the present invention comprises the process of making olefin react with the starting material, the resulting product may be less aromatic than the starting material and is apt to be expected to have a poor dye-solubility. But it has been found that a fraction having an index number in the range of −100 to 40 has a sufficient dye-solubility for use as the solvent for a dye to be applied to pressure-sensitive copying paper. As to the color-developability which is generally considered to be controlled by the viscosity and the aromaticity of the solvent, it has been found that the ideal color-developability can be expected of a fraction comprising more than 90 percent of the fractions boiling in the range of 260° to 320°C and having an index number in the range of −100 to 40.

Besides, it will be easily understood that the solvent obtained by the method of the present invention can also satisfactorily dissolve various dyes other than that to be applied to pressure-sensitive copying paper, such as dyes having the aromatic nucleus comprising a chromophore possessed of such unsaturated bonds as

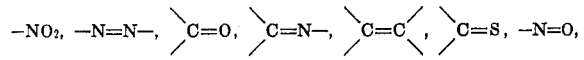

and auxochrome such as —OH, —NH$_2$, —NHR, —NHRR' (wherein R, R' each represents alkyl groups).

Further, the solvent according to the present invention is utilized for other uses in addition to its use as a dye solvent to take advantage of the aforesaid properties thereof, for instance, as a solvent for insecticides of the organic chlorine series, organic phosphorus series, carbamate series, and the like.

Inasmuch as the present solvent dissolves well the perfumes having an osmophore group such as

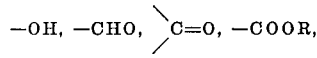

phenol ether, lactone, and the like and is odorless, it can be utilized as a solvent for perfumes with no danger of changing the odor of the perfume, per se.

Moreover, the product obtained by employing the starting material defined for the method of the present invention and making it react with olefin is remarkably improved in color appearance fluidity, stability, etc. compared with the starting material, and the acid value of the products examined after heating in an air atmosphere as well as the amount of the resulting sludge is conspicuously small in quantity, so that it can also be used as a heat-transfer medium. Those fractions of the product which have a relatively low boiling point are used as a heat-transfer medium for the gaseous phase while those fractions which have a relatively high boiling point are used as the heat-transfer medium for the liquid phase.

The product obtained by the present method can also serve as a solvent for printing ink, as a plasticizer for plastics, and the like.

As described in the foregoing, the method according to the present invention renders it possible to manufacture a special solvent of excellent properties by employing hydrocarbons as starting material whose effective utilization has heretofore been extremely limited.

Given in the following are examples embodying the method of the present invention.

DESCRIPTION OF THE PREFERRED EMBODIMENTS

Example 1

By employing the heavy oil byproduced in the manufacture of ethylene as the starting material and subjecting it to the process for imparting thermal stability, the process for hydrorefining and the process for reacting with ethylene, a fraction suitable as a solvent for a dye to be applied to the pressure-sensitive copying paper as well as the solvent for an insecticide was obtained. The properties of the starting material were as follows:

i. distilling properties: IBP 172°C, 50 percent distill-off point 263°C, 80 percent distill-off point 385°C; ii) maximum absorption wave-length λ max according to ultraviolet absorption spectrum 223 mλ; iii) index number 20; iv) sulfur-containing compounds (as sulfur) 320 p.p.m.; v) basic nitrogen compounds (as nitrogen) 9.1 p.p.m.; vi) specific gravity ($d_4^{15}$) 1.0480; vii) diene value 12.0.

The process for imparting thermal stability by selecting hydrogenation of the dienes and other unstable substances contained in said crude material was performed through the following steps: a pelletized catalyst of cylindrical shape (3 mm in diameter and length) employing diatomaceous earth as the carrier and containing 55 wt. percent of nickel and some copper as well as chromium was packed in a reactor of 25 mm in diameter and 5 m length; by passing a refined hydrogen gas through this reactor at the rate of 200 Nl/hr at the temperature of 180°C and a pressure of 20 Kg/cm$^2$G for 4 hours, the catalyst was reduced; next, the reactor was cooled down to 80°C, and at this temperature, by employing the catalyst prepared by passing gas oil therethrough under atmospheric pressure for 4 hours, the crude material was treated under the conditions of an oil feed rate of 5 l/hr, a hydrogen pressure of 40 Kg/cm$^2$G and a temperature at the inlet of reaction tube of 130°C. Subsequently, the thus treated oil was subjected to the hydrorefining process employing a reactor packed with a cobalt-molybdenum catalyst (3 mm diameter) presulfided with gas oil and performed under the conditions of a hydrogen pressure of 40 Kg/cm$^2$G, a temperature of 380°C and an oil feed rate of 5 l/hr. The properties of the thus refined oil were as follows:

i) distilling properties
    IBP                                 168 (°C)
    10%   distill-off point   200
    30%      do.             218

```
            50%      do.       235
            70%      do.       250
            90%      do.       310
ii)   index number  −20
iii)  sulfur-containing compound (as sulfur)     14.2 p.p.m.
iv)   basic nitrogen-containing compound
      (as nitrogen)                              3.5 p.p.m.
v)    specific gravity  $(d_4^{15})$             1.004
vi)   freezing point                             −10°C
```

Next, this oil was made to react with ethylene under the conditions of a reaction pressure of 40 Kg/cm²G, an oil feed rate of 5 l/hr, a temperature of 200°C and a molar ratio of ethylene to oil of 4.5 and by employing a silica-alumina catalyst (comprising 13 percent of alumina and having a diameter of 3 mm). The properties of the resulting reaction product were as follows:

```
i)    distilling properties
         IBP                               168 (°C)
         10%    distill-off point          212
         30%    do.                        238
         50%    do.                        270
         70%    do.                        320
         90%    do.                        418
ii)   index    −47
iii)  specific gravity $(d_4^{15})$        0.962
```

Comparison of this reaction product with the crude material through measurement of N.M.R. disclosed that aromatic proton had decreased while methylene and methyl proton added to aromatic had increased. Besides, the result of mass analysis infers that ethylene was added to the extent of about 2 mol per 1 mol of the material. The properties of a fraction boiling in the range of 260° to 320°C obtained by distillation of the foregoing product were as follows:

```
i)    index    −40           ($\delta$ = 229, $b_p$ = 285
                              index = 229 + 0.625 × 285 −
                              447
                                    = −40
ii)   specific gravity $(d_4^{15})$   0.958
iii)  viscosity (38°C)                9.5 cst
iv)   pour point                      <−47.5°C
```

This fraction was tested for applicability as a solvent for a dye to be employed for the pressure-sensitive copying paper.

As a result, it was found that this fraction, when compared with the conventional chlorinated biphenyl was remarkably improved in respect to the smell and possessed a good solubility for such dyes as Crystal Violet Laetone (CLV) and Benzoyl Leuco Methylene Blue (BLMB) as well as a good adsorbability for the substance capable of color reaction such as clay, entailing a good color-developability.

The properties of a fraction boiling in the range of 240° to 260°c obtained through separation by distillation of the foregoing product were as follows:

```
i)    specific gravity  $(d_4^{15})$    0.940
ii)   pour point                        <−50°C
iii)  flash point                       124°C
iv)   viscosity          (38°C)         6.5 cst
```

This fraction was not suitable as a solvent for dye to be employed for the pressure-sensitive copying paper. But, the result of the test for thermal stability conducted by heating this fraction in an autoclave at 350°C for 200 hours showed an increase in pressure of 3.0 Kg/cm²G. As compared with the increase in pressure by 10 Kg/cm²G in the case of a heat-transfer medium belonging to dimethyl naphthalene family, this fraction was by far superior. As to the color appearance, it showed but a slight change into yellow and proved to be fairly superior to the sample of comparative commercial heat-transfer media which became blackened. Thus, it was found to be satisfactory as the heat-transfer medium.

The properties of another fraction boiling in the range of 320° to 350°C obtained through separation by distillation of the foregoing product were as follows:

```
i)    specific gravity   $(d_4^{15})$    0.962
ii)   pour point                         −22.5°C
iii)  flash point                        165°C
iv)   viscosity          (38°C)          24 cst
v)    index                              −52
```

This fraction was fairly inferior in solubility and colordevelopability as a solvent for dye. However, when a mixture prepared by adding this fraction to the chlorine-containing insecticide DDT and further mixing with a urethane resin paint was applied to a kitchen-floor, the insecticidal efficacy proved to have been of long duration owing to the low volatility. This fraction is also usable as a solvent for such insecticides as organic phosphorous, parathion 0,0-diethyl-0-p-nitrophenyl phosphorothioate or Paraoxon(diethyl-p-nitrophenyl phosphate). Further, the result of the test for thermal stability conducted by applying the same condition as set forth above verified that this fraction is also usable as a heat-transfer medium.

Example 2

By employing the same starting material as in Example 1 and subjecting it to the process for imparting thermal stability and the process for hydrorefining under the same conditions as in Example 1 followed by a process for reacting with propylene, a fraction suitable for use as a solvent for perfume as well as dye was obtained. The reaction with propylene was effected under the condition of a reaction pressure of 5 Kg/cm²G, an oil feed rate of 3 l/hr, an average reaction temperature of 250°C and a molar ratio of propylene to oil of 1.3. The reactor was the same as in the example 1, and it was packed with 1 l of silica-alumina catalyst. The temperature at the inlet of the reaction tube was 120°C, and the temperature at the outlet after the reaction was 290°C. The resulting product was subjected to the same reaction once again under the same condition as above. The specific gravity reduced from $d_4^{15}$ =1.004 to $d_4^{15}$ =0.9606. Judging from the result of the mass analysis and the analysis of N.M.R., etc. conducted on this product, propylene was added to the extent of about 1.6 mol on the average per 1 mol of the material oil. The properties of a fraction boiling in the range of 260° to 320°C obtained through separation by distillation of this product were as follows:

```
i)    index              −63
ii)   specific gravity   $(d_4^{15})$    0.9622
iii)  viscosity          (38°C)          6.50 cst
iv)   pour point                         −45°C
```

This fraction was tested for applicability as a solvent for perfume, as follows:

When this fraction was microcapsulated upon adding thereto β-phenyl ethyl alcohol it emitted a fragrance like that of a rose and when it was coated on a paper to thereby prepare a pressure-sensitive scented paper, the resultant pressure-sensitive scented paper was capable of emitting a very sweet fragrance. Also when similar tests were conducted by applying the synthetic musk ketone and jasminal, the results were satisfactory.

When this fraction was tested for applicability as a solvent for dye to be employed for the pressure-sensitive copying paper, it proved by far superior to chlorinated biphenyl in respect of the smell, and also superior to the fraction boiling in range of 260° to 320°C obtained in Example 1. The solubility for CVL and BLMB was equivalent to that of the solvent belonging to chlorinated biphenyl, and the color-developability was also superior.

The properties of a fraction boiling in the range of 240° to 260°C obtained through separation by distillation of the foregoing product were as follows:

| i) | specific gravity | $(d_4^{15})$ | 0.9625 |
|---|---|---|---|
| ii) | pour point | <-55°C | |
| iii) | flash point | 120°C | |
| iv) | viscosity | (38°C) | 3.50 cst |

As a result of the test on the thermal stability conducted in the same way as in Example 1, this fraction proved superior as a heat-transfer medium.

The properties of another fraction boiling in the range of 320° to 350°C obtained through separation by distillation of the product according to the present example were as follows:

| i) | index | -57 | |
|---|---|---|---|
| ii) | specific gravity | $(d_4^{15})$ | 0.9567 |
| iii) | pour point | -25°C | |
| iv) | flash point | 164°C | |
| v) | viscosity | (38°C) | 25 cst |

When the yellow oil soluble dye (3,2'-dimethyl-4-aminoazobenzene) was dissolved in this fraction and the resulting mixture was blended with a lubricating oil, there was obtained a lubricating oil having a good color tone. Furthermore, this fraction proved also capable of dissolving well such dyes as indigo, Alizarin Blue, Alizarin Yellow-R, etc.

As a result of a test on the thermal stability, this fraction proved superior as a heat-transfer medium.

Example 3

By employing, as the starting material, a fraction comprising about 90 percent of fractions boiling in the range of 200° to 280°C obtained through distillation of a heavy oil from the dealkylation process of toluene, xylene and the like to benzene, a fraction suitable for use as a solvent was prepared by making propylene react with said material by the use of anhydrous aluminum chloride in an autoclave. The properties of the starting material were as follows:

| i) | index | -27 | |
|---|---|---|---|
| ii) | specific gravity | $(d_4^{15})$ | 1.028 |
| iii) | maximum absorption wave-length according to ultraviolet absorption spectrum, $\lambda$max | 224 m$\mu$ | |
| iv) | sulfur-containing compound (as sulfur) | | 23 p.p.m. |
| v) | basic nitrogen-containing compound (as nitrogen) | | 1.3 p.p.m. |

Upon charging 100 ml of this material in an autoclave having a capacity of 500 ml, 5 g of anhydrous aluminum chloride was put therein, and then 50 g of propylene liquefied by passing 95 percent propylene through the trap refrigerated to the degree of about -60°C by the use of dry-ice methanol was added to the material. Next, after closing the autoclave air-tight, the inner temperature of the autoclave was raised gradually, whereby the pressure which had been about 8 Kg/cm²G at room temperature became about 30 Kg/cm²G at about 80°C. But, when the temperature reached to about 80°C, the pressure rather showed a tendency to decrease, and the reaction started. The reaction was effected for 3 hours while applying agitation at the reaction temperature of 100°C. Upon completion of the reaction, 500 ml of 1N hydrochloric acid was added to the reaction product. This reaction product containing said acid was left standing for a while, and thereafter the oily fraction was extracted using benzene. Subsequently, by means of distillation, a fraction boiling in the range of 260° to 320°C was obtained. The properties of this fraction were as follows:

| i) | index | -35 | |
|---|---|---|---|
| ii) | specific gravity | $(d_4^{15})$ | 0.9632 |
| iii) | viscosity | (38°C) | 7.0 cst |
| iv) | pour point | -47.5°C | |

Analysis of this fraction proved the addition of propyl group. And this fraction showed a remarkable improvement in respect of not only its smell but also its ability to dissolve.

Example 4

One hundred grams of a naphthalene-containing fraction boiling in the range of 200° to 250°C (index = 5; maximum absorption wave-length according to ultraviolet absorption spectrum, $\lambda$max = 222 m$\mu$), which was obtained through dealkylation of the residue from the catalytic reforming of the naphtha, was employed as the starting material. By means of the same autoclave and the same operation thereof as in Example 3, 40 g of butylene was made to react with the material placed in said autoclave by adding 10 ml of orthophosphoric acid thereto and agitating the mixture while heating. When the temperature reached about 80°C, the pressure rose up to 15 Kg/cm²G; but as the temperature rose higher than 80°C, the pressure began to decrease. While further raising the temperature gradually, agitation was continued for 3 hours, whereby the reaction was completed. When the temperature was lowered to room temperature after completion of the reaction, the pressure became 0.3 Kg/cm²G. Subsequently, through the steps of washing the reaction product with water, extracting the oil layer by the use of benzene and removing the fractions having lower boiling points by distillation, a fraction boiling in the range of 280° to 300°C was obtained. The result of analysis by gas chromatography showed that this fraction was composed mainly of a monobutyl-containing compound of naphthalene, was almost odorless and was possessed of a superior quality as a heat-transfer medium as well as a solvent. The properties of this fraction were as follows:

| i) | index | -17 | |
|---|---|---|---|
| ii) | specific gravity | $(d_4^{15})$ | 0.964 |
| iii) | viscosity | (38°C) | 4.1 cst |
| iv) | pour point | -50°C | |

Example 5

100 g of a fraction boiling in the range of 204° to 288°C (index = 0; maximum absorption wave-length according to ultraviolet absorption spectrum, $\lambda$max = 266 m$\mu$), which was obtained from the residual oil arising from the catalytic reforming of naphtha, was employed as the starting material. By the use of an autoclave, this material was made to react with 50 g of propylene in the presence of 10 g of a solid phosphoric acid catalyst. The temperature for initiating the reaction was about 70°C, and the time employed for the reaction was 5 hours.

The properties of a fraction boiling in the range of 230° to 260°C obtained through separation by distillation of the product resulting from said reaction were as follows:

| | | | |
|---|---|---|---|
| i) | specific gravity | $(d_4^{15})$ | 0.950 |
| ii) | pour point | <−50°C | |
| iii) | flash point | 130°C | |
| iv) | viscosity | (38°C) | 7.0 cst |

The result of the test on the applicability of this point to pressuresensitive copying paper showed that this fraction was superior in color-developability but was unsuitable because of its smell. However, as a result of the test on the thermal stability, it proved to have a superior quality as a heat-transfer medium.

The properties of a fraction boiling in the range of 260° to 320°C obtained through separation by distillation of the foregoing reaction product were as follows:

| | | | |
|---|---|---|---|
| i) | index | −22 | |
| ii) | specific gravity | $(d_4^{15})$ | 0.958 |
| iii) | pour point | <−42.5°C | |
| iv) | viscosity | (38°C) | 10.5 cst |

The result of the test on the applicability of this fraction as solvent for a dye to be employed for the pressure-sensitive copying paper showed that this fraction was of superior quality.

The properties of a fraction boiling in the range of 320° to 350°C obtained through separation by distillation of the foregoing reaction product were as follows:

| | | | |
|---|---|---|---|
| i) | index | −47 | |
| ii) | specific gravity | $(d_4^{15})$ | 0.954 |
| iii) | pour point | −22.5°C | |
| iv) | flash point | 167°C | |

Example 6

One hundred milliliters of the same material as in Example 4 placed in an autoclave was made to react with 70 ml of styrene monomer in the presence of 10 g of 96 percent sulfuric acid added thereto. On this occasion, the temperature was raised gradually from room temperature to 50°C, and subsequently, while maintaining the temperature at 50°C, heating and agitation were continued for 5 hours, whereby the reaction was completed, and the temperature was then lowered to room temperature. Thereafter, through the steps of washing the reaction product with water, extracting the oil layer by the use of benzene and removing the fractions having lower boiling points by distillation, a fraction boiling in the range of 320° to 350°C was obtained. The result of analyses by N.M.R., gas chromatography, UV, etc. showed that this fraction contained styrene added thereto. The properties of this fraction were as follows:

| | | | |
|---|---|---|---|
| i) | index | +10 | |
| ii) | specific gravity | $(d_4^{15})$ | 1.006 |
| iii) | pour point | −10°C | |
| iv) | viscosity | (38°C) | 28 cst |

The result of the test on the applicability of this fraction as a solvent to be employed for the insecticide conducted in the same way as in Example 1 proved superior quality of this fraction.

When 30 percent of this fraction was blended with a fraction boiling in the range of 260° to 320°C obtained in Example 2, the properties of the blended fraction were as follows:

| | | | |
|---|---|---|---|
| i) | index | −40 | |
| ii) | specific gravity | $(d_4^{15})$ | 0.974 |
| iii) | viscosity | (38°C) | 9.0 cst |
| iv) | pour point | −30°C | |

This blended fraction was tested for its applicability as a solvent for the dye to be employed for the pressuresensitive copying paper.

The result of the test on the applicability to the solvent for the insecticide proved superior quality of this blend fraction.

Further, the result of the test on the thermal stability proved the usefulness of this blend fraction as a heat-transfer medium.

Example 7

When a fraction boiling in the range of 260° to 320°C obtained in Example 3 and a fraction having the same range of boiling point obtained in Example 4 were blended equivalently, the properties of the blend fraction were as follows:

| | | | |
|---|---|---|---|
| i) | index | −27 | |
| ii) | specific gravity | $(d_4^{15})$ | 0.964 |
| iii) | viscosity | (38°C) | 5.5 cst |
| iv) | pour point | −47.5°C | |

This blended fraction, when tested for its applicability as a solvent for a dye to be employed for the pressure-sensitive copying paper, also proved to have a superior quality. That is, it was superior to the commercial chlorinated biphenyl in respect of the smell and was capable of dissolving well such dyes as CVL, BLMB, and the like. Besides, the pressure-sensitive copying paper prepared by employing a solvent consisting of this fraction displayed a good color-developability.

Example 8

When a fraction boiling in the range of 260° to 320°C obtained in Example 2 was blended with 20 percent of a naphthene-base mineral oil which is commonly used as an insulating oil, the properties of this fraction changed as follows:

| | fraction according to Example 2 boiling in the range of 260 to 320°C. | fraction according to the present example |
|---|---|---|
| i) index | −62 | −89 |

|  |  |  | fraction according to Example 2 boiling in the range of 260 to 320°C. | fraction according to the present example |
|---|---|---|---|---|
| ii) | specific gravity | $(d_4^{18})$ | 0.9622 | 0.9515 |
| iii) | viscosity | (38°C) | 6.5 cst | 6.9 cst |
| iv) | pour point |  | −45°C | −45°C |

That is, through blending with the naphthene-base mineral oil, the index was reduced, but the fraction displayed a sufficient solubility as the solvent for dye.

What is claimed is:

1. A process for producing an alkylated hydrocarbon suitable as a solvent which comprises, reacting (A) hydrocarbon starting material consisting mainly of hydrocarbons boiling in the range of 200°C to 280°C, an index number of more than −100 and a maximum absorption wave-length, λmax, of the ultraviolet absorption spectrum of 220 to 230 mμ, wherein index number equals $\delta + 0.625 \text{b.p.} - 447$, and δ represents the specific dispersion at 20°C and b.p. is the boiling point in °C., with (B) an olefin having 2 to 9 carbon atoms, at a temperature in the range of 40° to 380°, at a pressure of 0 to 150 kg/cm² gauge and a liquid residence time of 0.1 to 5.0 hours, in the presence of (C) an acid catalyst until from 0.5 to 2.0 moles of said olefin is reacted per one mole of said starting material, to form an alkylated reaction product, recovering from said reaction product by distillation an alkylated hydrocarbon fraction having said index number in the range of −100 to 40 and having a boiling range of 260° to 320°C.

2. A process according to claim 1, wherein said hydrocarbon starting material is a member selected from the group consisting of the byproduced heavy oil obtained from high temperature cracking of naphtha or crude oil, the byproduced heavy oil obtained in the manufacturing of benzene, or naphthalene, by the dealkylation reaction, the residual fractions obtained by the catalytic reforming reaction of naphtha, or kerosene, and the light cycle oil obtained by the catalytic cracking of gas oil.

3. A process according to claim 1, wherein said acid catalyst is a solid acid catalyst selected from the group consisting of silica-alumina, crystalline aluminosilicate, silver-oxide silicaalumina, silica-magnesia, alumina-boria, solid phosphoric acid and nickel oxide-silica and having an acid content in the range of 0.01 to 10 meq./gr. as measured by the amine titration method employing the indicator of $pKa = 0.8$.

4. A process according to claim 1, wherein said olefin is a member selected from the group consisting of ethylene, propylene, butylene, cyclopentene, styrene, and methyl styrene.

5. A process according to claim 1, including the steps of recovering from said reaction product by distillation (1) an alkylated hydrocarbon fraction having a boiling range of 240° to 260°C, and (2) an alkylated hydrocarbon fraction having a boiling range of 320° to 350°C.

* * * * *